United States Patent [19]

Cahill et al.

[11] 4,309,619
[45] Jan. 5, 1982

[54] SOLAR ENERGY SYSTEM

[76] Inventors: Arthur L. Cahill, 1845 Vesta Way, Sacramento, Calif. 95825; John L. Scott, 12652 Willowood Ave., Garden Grove, Calif. 92640

[21] Appl. No.: 200,906

[22] Filed: Oct. 27, 1980

[51] Int. Cl.³ .............................................. F03G 7/02
[52] U.S. Cl. ..................................... 290/1 R; 60/641.8
[58] Field of Search ................. 290/1 R, 1 A, 2, 4 D; 60/641 A, 641 G, 641 AG, 641 AB, 641.6, 641.8, 641.12, 641.5

[56] References Cited

U.S. PATENT DOCUMENTS

| | | | |
|---|---|---|---|
| 2,969,637 | 1/1961 | Rowekamp | 60/641 A |
| 3,495,402 | 2/1970 | Yates | 60/641 G |
| 3,995,429 | 12/1976 | Peters | 60/641 A |
| 4,110,986 | 9/1978 | Tacchi | 60/641 A |
| 4,214,170 | 7/1980 | Leonard | 290/1 R |

FOREIGN PATENT DOCUMENTS 973375  8/1975  Canada ............................. 60/641 G Primary Examiner—Gene Z. Rubinson
Assistant Examiner—Shelley Wade

[57] ABSTRACT

A dynamic, self sustaining and self perpetuating, device for the production of motive force by combining cryogenic and thermodynamic principles into one system, keeping the systems separated, two open to atmosphere, the other closed, sealed, pressurized and utilizing special compounded fluids, which when alternately exposed to the heat of atmospheric temperature, then, to the coldness of a liquid or an air cooled condensor, first evaporates, then condenses. Rapid expansion during evaporation produces a high pressure vapor which operates an engine and a generator, which are an integral part of the closed system. Rapid condensation drastically reduces back pressure on the aft side of the engine, and the engine operates on the difference between the two pressures, producing electricity, or, the engine can be used as a direct drive for vehicles or equipment. Built in safeguards and alternatives are a part of the systems, assuring continuance of operation despite adverse conditions.

4 Claims, 1 Drawing Figure

SOLAR ENERGY SYSTEM

BACKGROUND OF THE INVENTION

1. Field of the Invention

This invention relates to a closed cycle, sealed, pressurized, energy producing system, utilizing the sciences of thermodynamics and cryogenics to convert liquid into gas, then back to liquid.

2. Description of the Prior Art

There is no exact prior art, as cryogenics have been used primarily for air conditioning and refrigeration purposes, and thermodynamic efforts have been directed in the area of low efficiency ocean thermal energy conversion systems. A few attempts have been made to combine some form of cryogenics and thermodynamics, without notable success, mainly using sea water for evaporation and condensing. While using no fuel and requiring little in the area of labor, these ocean thermal energy conversion systems are of necessity, low pressure systems and require large sea going platforms to support the huge turbines and heat exchangers which are necessary to produce reasonable electrical power, resulting in excessive capital costs for minimal electrical output, since such stations only have the ability to service a small portion of the populace along the seaboards. None of these contrivances serve or benefit the populace as a whole, while the whole bears the burden of financing through taxes, or government grants.

Proposals to heat gases and cool gases in an endeavor to improve the efficiency of home heating and cooling systems, have been previously advanced, some operating on the heat pump principle. All such previous proposals and inventions have had one thing in common, they all plug into the Utility Company's electric line to obtain the electricity necessary to run the system.

In cryogenics the knowledge that certain liquids, when heated, change into a high pressure vapor, which is the heart of all air conditioning and refrigeration systems, has been known for many years. Thermodynamics were pioneered by the 19th century French physicist Nicholas Carnot. Attempts have been advanced during the years to harness one or the other and sometimes both, for the purpose of heating and cooling, resulting in the invention of the heat pump in a much earlier year, but none of the systems yet devised for use by the general public have been able to operate without the use of an outside source of electricity, or, fuel, such as oil, or gas fired boilers, resulting in a considerable consumption of fuel and a cataclysmic effect on the earth's environment.

SUMMARY OF THE INVENTION

In accordance with the present invention, the device will operate in hot sunshine; on cloudy days without sunshine; during rainstorms; during snowstorms; during changes in temperature from day to night; during changes in seasons from winter, to spring, to summer, to fall; when it's cold, even below zero; for the power generated is that energy produced when a compounded fluid changes form, first to vapor, then back to liquid, by application of controlled temperatures within the sealed cycle. Thus, by combining cryogenics and thermodynamics into one system, keeping the two separated, one open to atmosphere and the other closed, sealed and pressurized, and by using fluids specifically compounded for the given area, or climate, these fluids, when exposed to atmospheric temperatures, in accordance with the kinetic theories of matter, gases and heat, provide the kinetic energy to operate an engine.

The condensor can be either liquid or air cooled, although for the embodiment depicted herein, the condensor is air cooled.

Generally speaking, there is up to an approximate 2.5 PSI increase associated with each degree of temperature rise in most cryogenic fluids and gases. However, using commercially available fluids, here are a few examples: At 125° F., R-22 produces gas pressure of 280 PSI; R-502=299 PSI; R-500=203 PSI; R-717=293 PSI. At 80° F. these liquids produce respectively, 145 PSI, 160 PSI, 102 PSI, 128 PSI and R-13 at 80° F. produces 521 PSI, or 35.4 times atmosphere. The latter, at 125° F. would produce up in the thousands of PSI. At 95° F. R-22=185 PSI, or a thrust on a five inch diameter piston of 3633.4 pounds. Even at 30° F., with R-22 a thrust of 583.2 pounds is obtained. R-13 at 30° F. produces 263 PSI or 5112.71 pounds of thrust on a five inch diameter piston. The pressures are there by using the Casco Perpetuating Energy System, utilizing proprietary formulated liquids for the area and temperatures to be encountered. It is not intended that any of these mentioned fluids will be used in the present invention; the comparisons being made herein with popular and well known liquids, for comparison purposes only.

THE INVENTION

The present invention relates to a device to supply pollution free power to operate a generator for the producing of electrical power, or, to supply power as a direct drive to a shaft, transmission, clutch, differential or the such, the invention being independent of outside sources of power such as electricity supplied by a Public Utility Company. This is not to be considered perpetual motion, as will be explained later in the text.

Proprietary liquids, specifically compounded to produce the desired results in a given area, or climate, under pressure in the reservoir to keep them in a liquid state, will, when directed through tubes exposed to atmospheric temperature, change from a liquid state into a gaseous state (hereinafter referred to as steam), such conversion resulting in tremendous expansion, thus producing high pressure steam with which to drive the engine, or turbine (hereinafter referred to only as engine).

It is a general object of this invention to provide a pollution free device for public utilization, that will produce electrical power or, direct drive power.

One object is to produce electrical power with which to heat, cool, cook, run electrical appliances and light a home.

Another object of the invention is to provide industry with a pollution free means to not only heat, cool and light their factories, but to supply electrical or direct drive power with which to operate their factory equipment.

A still further object of the invention is to provide a pollution free source of power to propel automobiles, trains, trucks, buses, equipment, steamships, airplanes, and other forms of transportation, without the use of fossil fuels as the primary source.

It is also an object of the present invention to provide the means whereby individuals can produce electrical power for their own use, and as a small power production, sell their surplus electrical power to cogeneration power producers, in accordance with public law 95-617 dated Nov. 9, 1978.

A further object of the invention is to provide a self sustaining, small apparatus, that provides ample power from the engine to operate an automobile or other conveyance, or to supply sufficient electrical power to a home or factory, without having to plug the apparatus into a Public Utility electrical supply.

Other objects and features of the invention will be appreciated and become apparent as the present disclosure proceeds and upon consideration of the following detailed description taken in conjunction with the accompanying drawing.

DETAILED DESCRIPTION OF A PREFERRED EMBODIMENT

Figure 1:
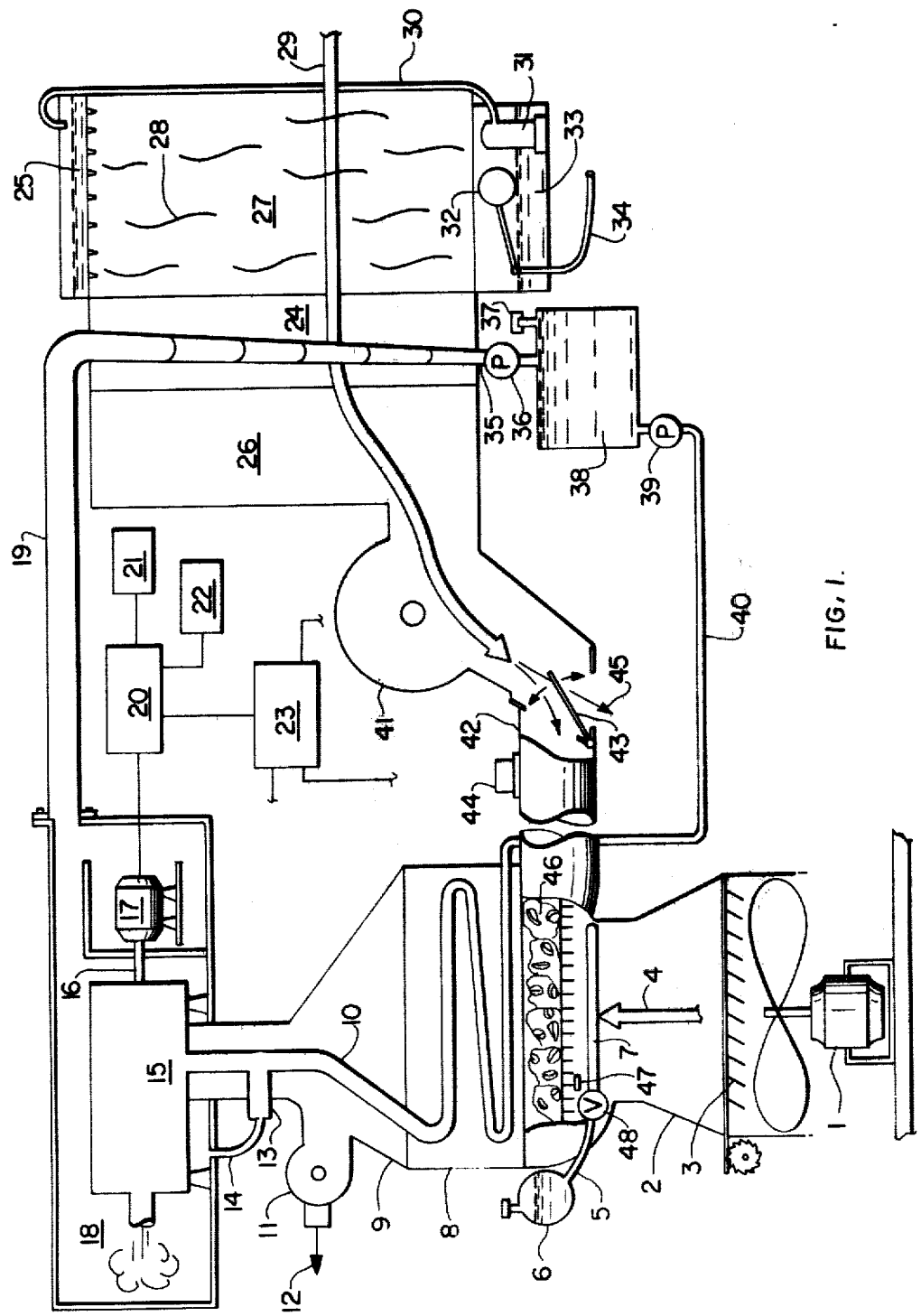
FIG. 1 is a partially sectioned schematic view of the system.

In the drawing, FIG. 1, the invention is shown in a preferred embodiment for home use. The liquid pump 39, pumps the cryogenic fluid from the pressurized liquid reservoir 38, into liquid line 40, where the fluid gravity feeds into flash boiler 8. Pump 39 also prevents back pressure from flash boiler 8 from entering the pressurized liquid reservoir 38, and since the pressure within steam line 10 and liquid line 40 are equal, the cryogenic fluid gravity feeds down liquid line 40 into steam line 10. The fins on flash boiler 8 are heated to atmospheric temperature by air stream 4, which converts the fluid within steam line 10, inside flash boiler 8 into high pressure steam. To maintain the pressure during the passage of steam to the engine 15, steam line 10 from flash boiler 8 is housed inside the oven 9, oven 9 being exhausted when necessary by discharge 12 from centrifugal blower 11. Constant temperature within oven 9 and flash boiler 8 is maintained by the admission of fresh atmosphere via air stream 4 passing through the finned flash boiler 8 and up through oven 9. Centrifugal blower 11 is thermostatically controlled to exhaust air within oven 9 which has cooled below a predetermined temperature. Any excess pressure within steam line 10 is by-passed through check valve 13 and bleed line 14 into the exhaust collector box 18, thus, a pressurized, closed system is maintained, which, once charged, unless an accident damages or ruptures a line, should not have to be replenished. Pressure within the exhaust collection box 18 will be less than the inlet pressure from steam line 10 to engine 15, because the condensor 24 is at a lower pressure, as is steam return tube 19, than PSI input to engine 15 from steam line 10, thereby creating a suction on the backside of the exhaust collector box 18.

Airstream 29, which has been cooled by evaporator cooler 27, flows over the finned surfaces of condensor 24, instantly lowering the temperature of the steam within condensor 24 below a predetermined condensation point, thus reverting the steam back to a liquid, such reversion and instant reduction of volulme within condensor 24 causing a pressure reduction on the backside of engine 15. This condensed liquid drains down into liquid coil return 35, where it is immediately pumped into the pressurized liquid reservoir 38 by liquid pump 36.

While under pressure in pressurized liquid reservoir 38, the fluid is maintained in a liquid state regardless of exterior temperature, until it is re-circulated back into the system by liquid pump 39, through liquid line 40 to flash boiler 8, where it again converts itself into steam.

The capacity of evaporator cooler 27 and packing 28 is sufficient to cool intake air stream 29 to a predetermined temperature below atmospheric temperature at any given time, even with humidity rise at night, or during rainstorms, or just during high humidity weather. This temperature differential is maintained as the atmospheric temperature rises and falls, with an anti-freeze liquid being added to the water in the evaporator cooler when temperatures drop below 32° F., to keep it from freezing.

Additional warm air to augment air stream 4 is obtained by directing the warm air exhaust collected in hot exhaust air collector 26, by centrifugal blower 41, through tee assembly 42. Air flow through tee assembly 42 is directed and controlled by warm air control means 44, which regulates flow damper 43 to either exhaust through exit 45 into atmosphere, or, recirculate air flow 29 through restricted tee 42, thereby compressing and further heating air flow 29 before injecting it through flash boiler 8. Warm air control means 44 also controls fan 1 and louvers 3, selecting the optimum heat from either tee 42 or variable venturi 2, to perpetuate the system.

The evaporator cooler 27 has an inlet water pipe 34 which supplies cold water from the normal house water supply, or well, (neither shown). The bottom water reservoir 33 is kept at a constant level of water by float and valve 32. The water is pumped by pump 31 up tube 30 into the top water reservoir 25, where it runs through the perforated bottom of reservoir 25 down onto the packing 28, keeping packing 28 constantly wet, which cools air flow 29 as it is drawn through packing 28 and over the fins of condensor 24 by the partial vacuum in the hot air exhaust collector 26, such partial vacuum being created by centrifugal blower 41 exhausting the air from the hot exhaust air collector 26 slightly faster than air flow 29 can replace it.

As long as there is warmer air on the flash boiler 8 side of the system than the cooler condensor 24 side of the system, this device will continue to operate and produce electricity and/or power. The heat recirculating system and the utilization of three separate, distinct systems within the system, one sealed, permits the system to perpetuate itself. As mentioned above, this device is not to be considered perpetual motion, for somewhere in the ranges of temperature differentials and weather conditions, there may be a no-man's land where the system could shut down, then the variable venturi 2, in conjunction with motor and fan 1 and louvers 3, will come into use automatically upon a signal from warm air control means 44 and 12 volt control means 23, and be used for a period of time. Motor and fan 1 forces air stream 4 upward through the variable venturi 2, with air stream 4 controlled by warm air control means 44 and 12 volt control means 23, adjusting louvers 3. As air stream 4 is forced through the restriction of variable venturi 2, air stream 4 is compressed as it funnels up the narrowing walls of the variable venturi 2, such compression causing the air to heat, thus overcoming possible deadlocked or identical temperatures between the condensor 24 and air flow 4. This slight temperature rise in air stream 4 will enable the system to perpetuate itself until the atmospheric temperature itself changes enough to permit a continued operation. Since fan and motor 1 is run by battery power from 12 volt control means 23, even though the batteries are constantly being charged during operation, the batteries may become exhausted because of an extended time the fan and motor 1 are run, then, or, if for any other reason the system starts to run down, a small burner 7, operating on liquid or gaseous fuel 6, through line 5 and valve 48, is ignited by spark mechanism 47 and supplies the heat necessary to support and perpetuate the system until atmospheric temperature and condensing temperature permits the system to operate normally. Fired clay heat retainers 46 are arranged on grate within burner 7, to retain heat.

The cryogenic system is charged by filling with liquid under pressure through fill pipe 37. Re-charging, if necessary, is accomplished in the same manner.

Engine 15 turns drive shaft 16, which turns generator 17, producing electrical power to 110/220 electric control means 20. Electric control means 20 dispenses the electricity received from generator 17 into three channels: One; To 12 volt control means 23, to run the electrical parts of the system and keep the batteries charged. Two; To the house 22, to supply the electricity with which to cook, run appliances, light, heat and cool the home. Three; All electricity not consumed by one and two above, is channelled through utility meter 21 into a cogeneration power producer's electrical line and sold to him for use elsewhere within his cogeneration system.

This invention has been illustrated and described in a preferred embodiment. Since many variations and modifications of the invention will now be obvious to those skilled in the art, it is not intended that the invention be limited hereby to the specific construction shown. On the contrary, it is intended to cover all modifications and alternative constructions falling within the spirit and scope of the invention as defined in the appended claim.

What we claim is:

1. An energy producing combination of two open and one closed thermodynamic systems wherein:

said closed thermodynamic system circulates a cryogenic fluid from a pressurized reservoir to a flash evaporator, said fluid then driving a mechanical energy transducer;

one of said open thermodynamic systems includes a heat sink open to the atmosphere to cool a heat transferring medium, said cooled medium then being used to condense the cryogenic fluid after which the medium helps to heat the cryogenic fluid at a later point in its closed cycle; and the second open thermodynamic systems includes adjustable atmospheric air induction to an oven containing the flash evaporator with means to warm said air by compression.

2. The combination of claim 1 further comprising a generator.

3. The combination of claim 1 or 2 further including an emergency burner in the oven enclosing the flash boiler.

4. The combination of claim 2 further including means to feed excess electricity produced to a Utility line.

* * * * *